A. L. ARENBERG.
LIGHTING UNIT.
APPLICATION FILED JUNE 22, 1918.
1,302,492.
Patented May 6, 1919.
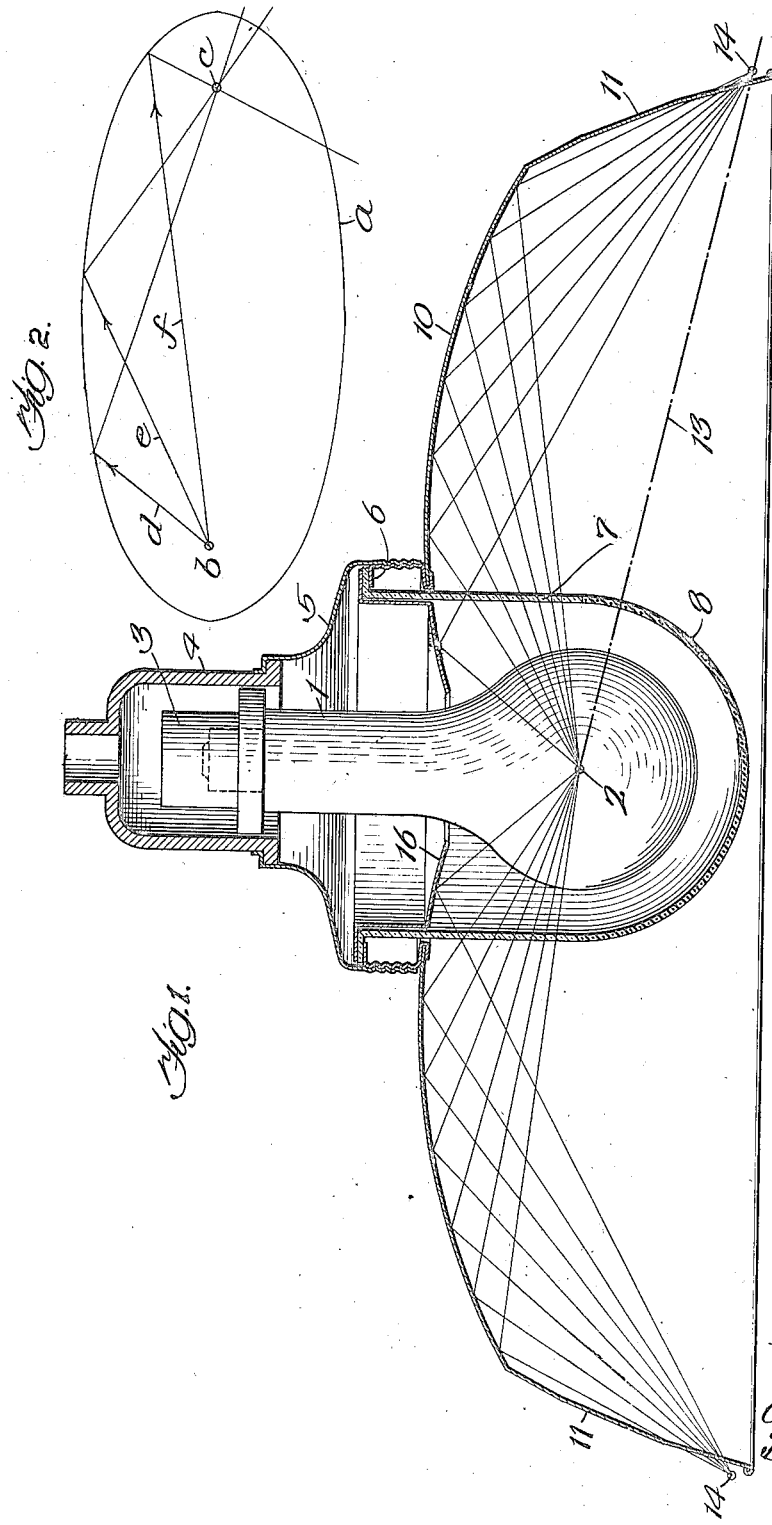
Inventor:
Albert L.
Arenberg
By Cheever & Cox
Attys

UNITED STATES PATENT OFFICE.

ALBERT L. ARENBERG, OF CHICAGO, ILLINOIS.

LIGHTING UNIT.

1,302,492.      Specification of Letters Patent.      Patented May 6, 1919.

Application filed June 22, 1918. Serial No. 241,416.

*To all whom it may concern:*

Be it known that I, ALBERT L. ARENBERG, a citizen of the United States, residing at Chicago, in the county of Cook and State of Illinois, have invented a certain new and useful Improvement in Lighting Units, of which the following is a specification.

My invention relates to lighting units, more particularly electric lighting units employing lamps giving a light of considerable intensity. The object of my invention is to provide a construction which will prevent the light rays from passing directly from the source of light to the eye of the observer or from passing to the eye of the observer after having been reflected but once. In other words, it is my purpose to make the light rays strike at least two reflective surfaces before entering the eye, except in the case of such rays as pass downward from the source of light, and as to such downwardly extending rays my purpose is to either dim them or to reflect them upward to the shade, thus causing them to impinge upon two reflecting surfaces before entering the observer's eye. As a result of this construction the observer is protected from unpleasant glare and the light is thoroughly diffused over the area lighted.

I obtain my objects by the construction illustrated in the accompanying drawings in which Figure 1 is a central vertical section of the unit showing the lamp in position, and Fig. 2 is a diagram illustrating the reflection of light rays in an ellipse when the source of light is located at one of the foci.

Referring first to the diagram, $a$ represents an ellipse having two foci $b$ and $c$. Let it be assumed that a source of light is concentrated at focus $b$. It is one of the properties of an ellipse that in such case all of the light rays striking any part of the internal surface will be reflected through the other focus $c$. For example, rays $d$, $e$, and $f$, upon striking the ellipse will be reflected back to the focus $c$. I have constructed a reflector shade and means for supporting it and a light in such manner as to take advantage of this property of the ellipse to obtain my objects and purposes above stated.

Referring to the physical structure shown in Fig. 2, the electric lamp bulb 1 has a filament so constructed and arranged that its light is substantially concentrated at the point 2. Of course the light cannot, as a practical matter, be concentrated at a mathematical point, but this can be and is rather closely approximated in well known commercial lamps and may be properly so treated. The lamp enters a socket 3 mounted in a support 4 of any suitable type carrying a shade holder 5. In the particular form shown the lower rim shade holder is threaded to receive a correspondingly threaded ring 6 which screws inside of the shade holder. This ring supports the globe 7 which surrounds the lamp and may assume different forms. In the type illustrated, the bottom 8 of the globe, is spherical and is so prepared as to serve as a reflector to throw the light rays upward. In consequence, the rays cannot pass directly to the eye of the observer, although a somewhat similar effect may be obtained by frosting this lower portion of the globe, in which case a portion of the light will be reflected upward, and another portion, dimmed, will pass directly through the globe.

The shade proper has a reflecting inner surface, and the main body is formed in two parts, 10 and 11. In the preferred form these parts are integral with each other and are supported by ring 6. The part 10, which may be termed " the crown " conforms to a surface generated by an ellipse revolved about a line perpendicular to its major axis and passing through one of the foci. The generating ellipse is so placed that its major axis will correspond to the dot and dash line 13, Fig. 2, with one focus at the point 2 and the other at the point 14. The second focus 14 is slightly above the level of the lower edge of the flange 11, and by preference is slightly outside of the flange, the result being that the light rays reflected by the crown 10 do not actually converge on the surface of the flange, but strike it at slightly different points so that the light is diffused and the observer, looking at the inside of the flange will not see, reflected in it, an image of the lamp filament. Thus, the observer does not see a ring of concentrated light on the flange, which would be unpleasant and represent a non-uniform distribution.

It is desirable to provide a supplemental reflector 16 on the inside of the globe, the lower portion conforming to and forming a continuation of the crown 10 of the shade. The supplemental shade is annular and flanged in such manner as to seat upon the upper edge of the globe.

In practice, those rays of light which pass downward from the source will be intercepted by the treated portion 8 of the globe 7, and in case this lower portion of the globe is a complete reflector, the light rays will be reflected from it upward to some portion of the crown 10, 16 of the shade. The rays passing directly from the source to the crown will be reflected toward the focal ring 14, but before reaching it will strike the flange 11 and be reflected by it downward and inward. The consequence is that the observer never sees, undimmed, the source of light, but receives the light after it has been reflected at least once, and in the case of most of the rays, twice. By preference, the source of light is between the levels of the upper and lower part of the flange 11 and there will be few, if any, rays which pass directly from the source to the internal surface of the flange. Most, if not all of the rays which would strike the flange direct are wholly or partially intercepted by the treated portion 8 of the globe.

As a result of my invention the light is most completely diffused, thus preventing glare, and at the same time it is confined within a definite area beneath the lighting unit.

Having thus described my invention, what I claim as new and desire to secure by Letters Patent, is:

1. A lighting unit having a lamp socket and a reflector shade held in definite relation to it, the shade having a crown conforming substantially to an ellipse with one focus at the point from which the light emanates, there being an annular flange depending from the rim of the crown, and passing approximately through the other focus of said ellipse whereby all the light rays which strike the crown are deflected to the flange.

2. A lighting unit having a lamp socket and a reflector shade held in definite relation to it, the shade having a crown conforming substantially to an ellipse with one focus at the point from which the light emanates, there being an annular flange depending from the rim of the crown, and passing approximately through the other focus of said ellipse, the parts being so constructed that the axis of the ellipse is higher at the focus located at the source of light than at the other focus whereby the only rays which are not reflected are those which travel below a horizontal plane passing through said source.

3. In combination, an electric lamp socket, a shade holder connected thereto, a globe carried by said shade holder and adapted to surround the lamp, said globe being adapted to intercept rays below the horizontal, and a reflector shade having a crown conforming approximately to an ellipse, one focus whereof is at the lamp filament, and a flange depending from the rim of said crown and passing approximately through the other focus, the lower rim of the flange being below the lamp filament, whereby all horizontal rays, or those above horizontal either strike the crown and are deflected to the flange, or else strike the flange.

4. In combination, an electric lamp socket, a shade holder connected thereto, a globe carried by said shade holder, and adapted to surround the lamp, said globe being adapted to intercept rays below the horizontal, and a reflector shade having a crown conforming approximately to an ellipse, one focus whereof is at the lamp filament, and a rim depending from said crown and passing approximately through the other focus, the lower rim of the flange being below the lamp filament, the crown being formed of two separate parts, one of which is outside and the other inside of the globe.

In witness whereof, I have hereunto subscribed my name.

ALBERT L. ARENBERG.